United States Patent
Zheng et al.

(10) Patent No.: US 11,126,452 B2
(45) Date of Patent: Sep. 21, 2021

(54) PERFORMANCE MODELING FOR VIRTUALIZATION ENVIRONMENTS

(71) Applicant: VMware, Inc., Palo Alto, CA (US)

(72) Inventors: Haoqiang Zheng, Cupertino, CA (US); Fei Guo, Palo Alto, CA (US); Zhelong Pan, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 137 days.

(21) Appl. No.: 16/111,397

(22) Filed: Aug. 24, 2018

(65) Prior Publication Data

US 2020/0065125 A1 Feb. 27, 2020

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45591* (2013.01); *G06F 2009/45595* (2013.01)

(58) Field of Classification Search
CPC . G06F 2009/45562–45575; G06F 9/45558–46
See application file for complete search history.

(56) References Cited

U.S. PATENT DOCUMENTS

| | | | |
|---|---|---|---|
| 8,095,929 B1* | 1/2012 | Ji | G06F 9/4856 709/223 |
| 10,334,044 B1* | 6/2019 | Bigman | H04L 67/1097 |
| 2012/0084774 A1* | 4/2012 | Post | G06F 9/5088 718/1 |
| 2017/0010911 A1* | 1/2017 | Maji | G06F 9/45558 |

OTHER PUBLICATIONS

IAware: Making Live Migration of Virtual Machines Interference-Aware in the Cloud Fei Xu, Fangming Liu, Linghui Liu, Hai Jin (Year: 2014).*
Dynamic Virtual Machine Placement for Cloud Computing Environments Xinying Zheng Yu Cai (Year: 2014).*
Plug4Green: A flexible energy-aware VM manager to fit data centre particularities Corentin Dupont, Fabien Hermenier, Thomas Schulze, Robert Basmadjian, Andrey Somov, Giovanni Giuliani (Year: 2014).*

(Continued)

*Primary Examiner* — Emerson C Puente
*Assistant Examiner* — Paul V Mills
(74) *Attorney, Agent, or Firm* — Thomas Horstemeyer, LLP

(57) ABSTRACT

Disclosed are various embodiments for distributing the load of a plurality of virtual machines across a plurality of hosts. A first plurality of efficiency ratings for a current host of a virtual machine are calculated. A second plurality of efficiency ratings for a potential new host of the virtual machine are also calculated. The first plurality of efficiency ratings are compared to the second plurality of efficiency ratings to determine that the potential new host for the virtual machine is an optimal host for the virtual machine. Then migration of the virtual machine from the current host to the optimal host is initiated.

20 Claims, 5 Drawing Sheets

(56) References Cited

OTHER PUBLICATIONS

Reliability-aware Server Consolidation for Balancing Energy-Lifetime Trade off in Virtualized Cloud Datacenters Wei Deng, Fangming Liu, Hai Jin*†, Xiaofei Liao, Haikun Liu (Year: 2013).*
Modelling the Live Migration Time of Virtual Machines Kateryna Rybina(B), Waltenegus Dargie, Subramanya Umashankar, and Alexander Schill (Year: 2015).*
Delay-cost tradeoff for virtual machine migration in cloud data centers Xiumin Wang, Xiaoming Chen, Chau Yuen, Weiwei Wue, Meng Zhang (Year: 2016).*
Sandpiper: Black-box and gray-box resource management for virtual machines Timothy Wood, Prashant Shenoy, Arun Venkataramani, Mazin Yousif (Year: 2009).*
Validating Heuristics for Virtual Machines Consolidation Sangmin Lee, Rina Panigrahy, Vijayan Prabhakaran, Venugopalan Ramasubramanian (Year: 2011).*
A Survey on Virtual Machine Migration: Challenges, Techniques, and Open Issues Fei Zhang, Guangming Liu, Xiaoming Fu, and Ramin Yahyapour (Year: 2018).*
Costs of Virtual Machine Live Migration: A Survey Anja Strunk (Year: 2012).*

\* cited by examiner

PERFORMANCE MODELING FOR VIRTUALIZATION ENVIRONMENTS

CROSS-REFERENCE TO RELATED APPLICATIONS

This application is related to copending U.S. patent application Ser. No. 16/111,582, entitled "RESOURCE OPTIMIZATION FOR VIRTUALIZATION ENVIRONMENTS" and filed on even date herewith, which is incorporated by reference as if set forth herein in its entirety.

BACKGROUND

Many enterprises use virtualization environments to consolidate computation onto a smaller number of physical devices. For example, a virtualization server may be used to host several virtual machines, each of which is executed to perform a task or host a service. In larger virtualization environments, a number of hosts may be used to host a number of virtual machines. As additional virtual machines are instantiated, or currently executing virtual machines begin to consume more resources, the initial deployment of virtual machines to individual hosts may become suboptimal. For example, a host may become oversubscribed as the hosted virtual machines begin to consume more memory than is installed on the host or consume more processing cycles than the processor of the host can provide.

Accordingly, many virtualization environments include a mechanism for reassigning virtual machines between hosts to more efficiently use the available resources of individual hosts. However, current mechanisms for rebalancing the load placed on hosts by guest virtual machines often provide sub-optimal results. For instance, current mechanisms may apply a uniform approach to determining whether to migrate a virtual machine from one host to another without considering specific performance requirements for the virtual machine.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to performance modeling and resource optimization for virtualization environments. Several computing devices in a virtualization environment may be used to host a number of virtual machines. As the resource demands of the individual virtual machines increase or decrease over time, the assignment of individual virtual machines to particular hosts may need to be adjusted in order to optimize the usage of the computing resources of the hosts that are available to the virtual machines. Accordingly, individual hosts may be evaluated for each virtual machine to identify the optimal host for the virtual machine. However, the costs involved in migrating the virtual machine from its current host to the optimal host may also be considered to determine whether there is a practical benefit to migrating the virtual machine to a new host.

Figure 1:
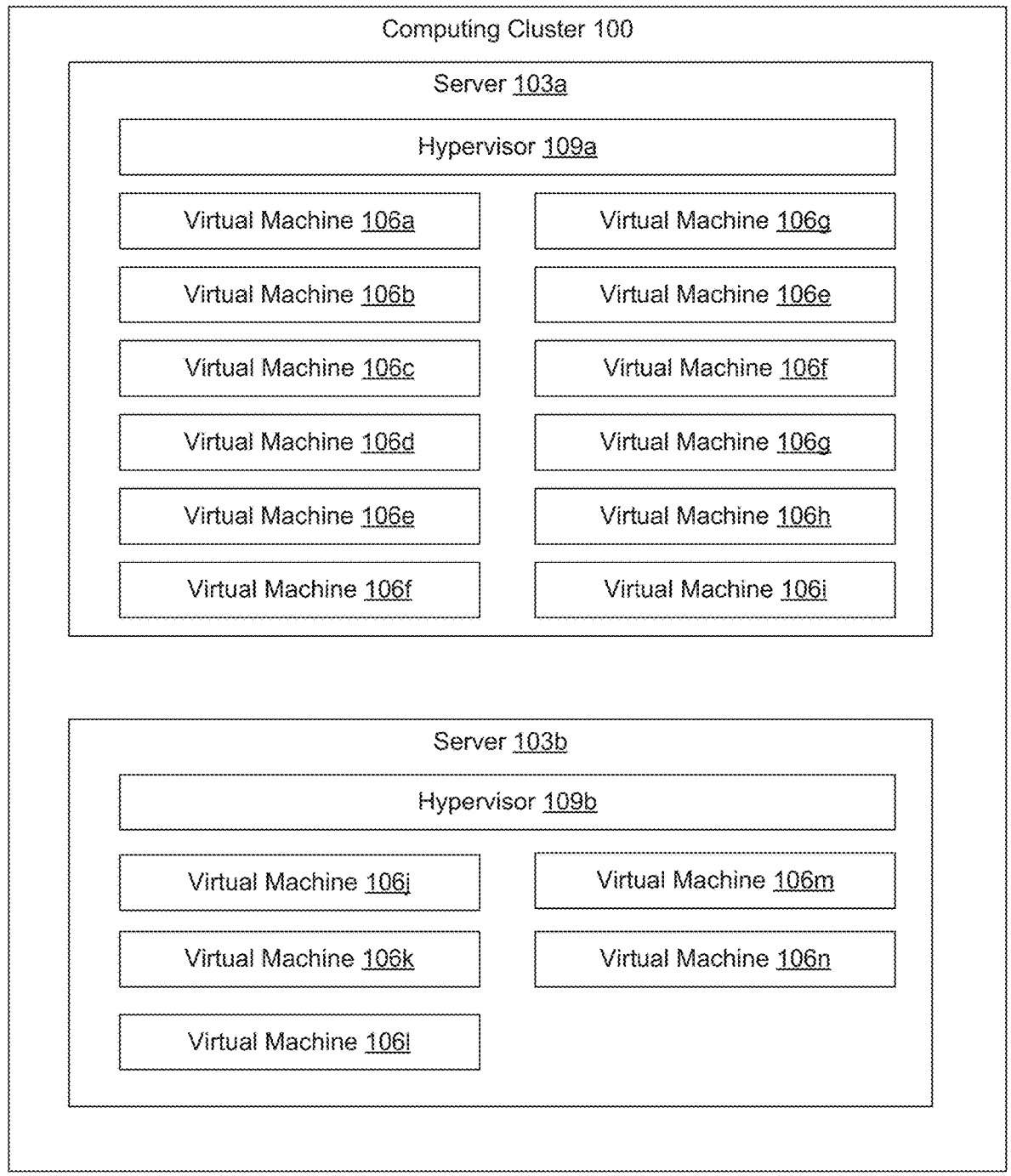
FIG. 1 is a drawing of an example of a computing cluster providing a virtualization environment having computing clusters capable of executing virtual machines.

Beginning with FIG. 1, shown is a schematic block diagram depicting an example of a computing cluster 100. The computing cluster 100 can include one or more servers 103, such as server 103a and server 103b as depicted. Each server 103 can act as a host for one or more virtual machines 106, such as virtual machines 106a-106n as depicted. A hypervisor 109, such as hypervisors 109a and 109b, may be installed on individual servers 103 to manage the execution of virtual machines 106 on the host server 103. Because the computing cluster 100 provides for multiple servers 103 hosting multiple VMs 106, the computing cluster 100 may also be referred to as a virtualization environment.

A server 103 can include any processor-based computing device. The server 103 may have one or more processors, random access memory (RAM) for temporary storage of data or program instructions, non-volatile storage media for long term storage of data or programs, one or more network interface cards, and potentially other hardware.

A virtual machine (VM) 106 represents a software emulation of a computer system. Accordingly, a virtual machine 106 may provide the functionality of a physical computer sufficient to execute an entire operating system and any applications that are supported or executable by the operating system. Accordingly, a virtual machine 106 may be used as a substitute for a physical machine.

A hypervisor 109 can be executed to manage the hardware resources (e.g., processor, memory, storage, network connectivity, peripherals, etc.) of a server 103 and share the hardware resources of the server 103 among multiple virtual machines 106. As a result, the hypervisor 109 can allow for multiple virtual machines 106 to be executed or hosted by the same server 103, while remaining isolated from each other. Many hypervisors 109 may use virtualization-specific features provided by the processor of the server 103 in order to efficiently share and manage the hardware resources of the server 103 among the hosted virtual machines 106. Examples of hypervisors 109 include the VMware ESX™ hypervisor, the VMware ESXi™ hypervisor, or similar hypervisor. The hypervisor 109 may also track and report resource usage of individual virtual machines 106 hosted by the server 103. In addition, the hypervisor 109 may also migrate a virtual machine 106 from one server 103 to another server 103. Migration may occur in order to balance or optimize the resource usage of virtual machines 106 among the servers 103 in the computing cluster 100.

Figure 2:
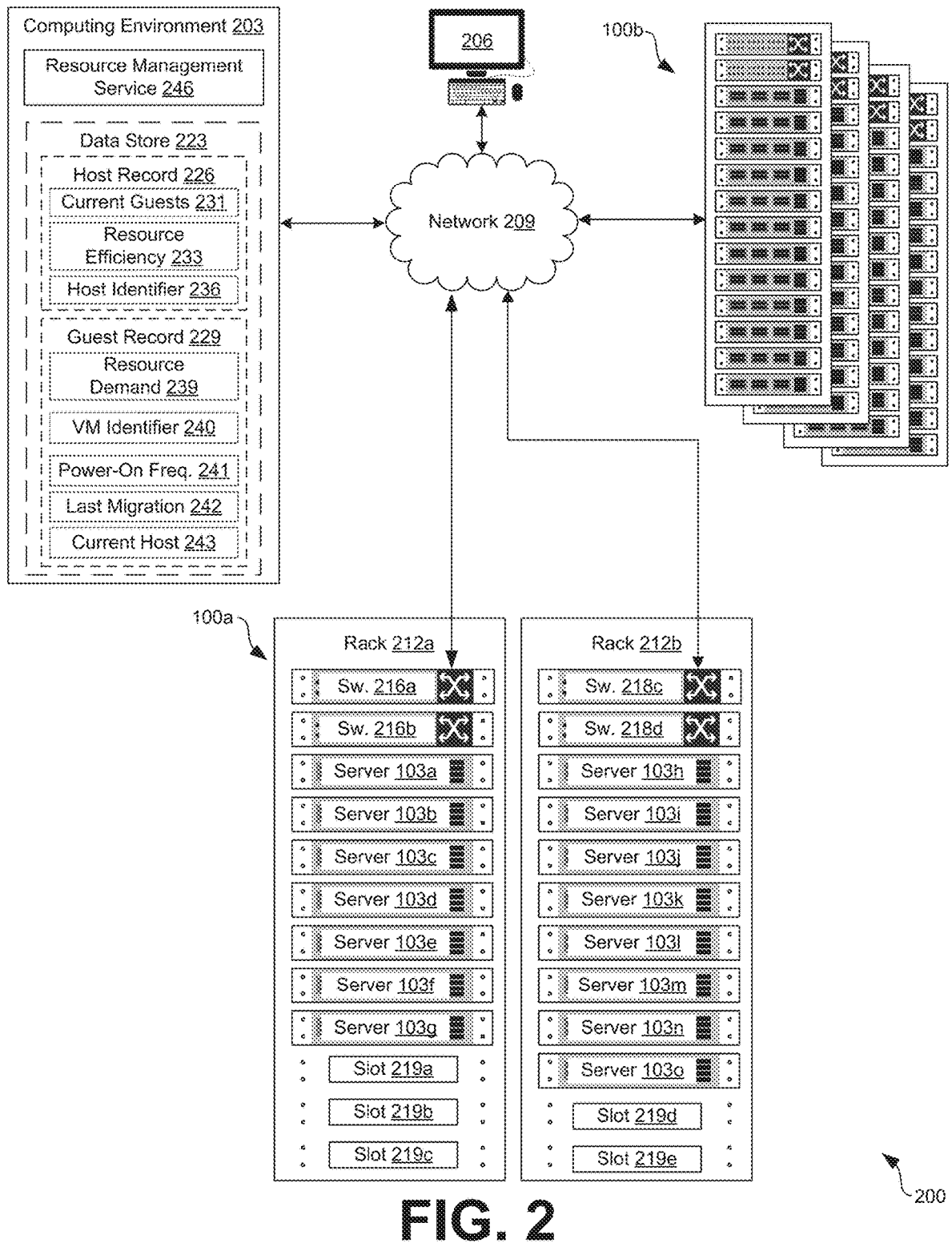
FIG. 2 is an example of a network environment that provides for one or more computing clusters.

With reference to FIG. 2, an example of a networked environment 200 is shown. The network environment 200 can include a computing environment 203, various computing clusters 100a . . . 100b, and one or more client devices 206 in communication with one other over a network 209. The network 209 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLU- ETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks. As the network environment 200 can host multiple virtual machines 106, the network environment 200 can also be described as a virtualized computing environment.

In various embodiments, the computing clusters 100 can include a plurality of devices installed in racks 212, such as racks 212a and 212b, which can make up a server bank, aggregate computing system, or a computer bank in a data center or other like facility. In some examples, the computing cluster can include a high-availability computing cluster. A high-availability computing cluster is a group of computing devices that act as a single system and provides a continuous uptime. The devices in the computing clusters 100 can include any number of physical machines, virtual machines, virtual appliances, and software, such as operating systems, drivers, hypervisors, scripts, and applications.

In some examples, the computing environment 203 can include an enterprise computing environment that includes hundreds or even thousands of physical machines, virtual machines, and other software implemented in devices stored in racks 112, distributed geographically and connected to one another through the network 209. It is understood that any virtual machine or virtual appliance is implemented using at least one physical device, such as a server 103.

The devices in the racks 112 can include, for example, memory and storage devices, servers 103a . . . 103o, switches 216a . . . 216d, graphics cards (having one or more GPUs installed thereon), central processing units (CPUs), power supplies, and similar devices. The devices, such as servers 103 and switches 216, can have dimensions suitable for quick installation in slots 219, such as slots 219a . . . i, on the racks 112. In various examples, the servers 103 can include requisite physical hardware and software to create and manage a virtualization infrastructure. The physical hardware for a server 103 can include a CPU, graphics card (having one or more GPUs), data bus, memory, and other components. In some examples, the servers 103 can include a pre-configured hyper-converged computing device where a hyper-converged computing device includes pre-tested, pre-configured, and pre-integrated storage, server and network components, including software, that are positioned in an enclosure installed in a slot 219 on a rack 212.

It is understood that the computing clusters 100 are scalable, meaning that the computing clusters 100 in the networked environment 200 can be scaled dynamically to include additional servers 103, switches 216, GPUs, power sources, and other components, without degrading performance of the virtualization environment.

In some examples, the hosts in the computing cluster 100 are monitored. In the event of a failure, the virtual machines 106 or virtual appliances on a failed host server 103 are restarted on alternate host servers 103. Similarly, if individual host servers 103 in the computing cluster 100 are found to be hosting too many virtual machines 106 or virtual appliances in view of the resources available to the individual host servers 103, one or more of the virtual machines 106 or virtual appliances may be migrated to another host server 103 in the computing cluster 100 with more available capacity. As an example, if a host has ninety-six gigabytes of random access memory (RAM) installed, but one-hundred twenty-eight gigabytes of RAM are required to service the virtual machines 106 or virtual appliances executing on the host server 103, one or more of the virtual machines 106 or virtual appliances may be migrated to one or more other hosts in the computing cluster 100 to balance the memory load of the virtual machines 106 across multiple hosts.

In various examples, when a host (e.g., a physical server 103) is added to a computing cluster 100, an agent application can be uploaded to the host and configured to communicate with other agent applications in the computing cluster 100. Some of the host servers 103 in the computing cluster 100 can be designated as primary hosts, and other hosts in the computing cluster 100 can be designated as secondary hosts. The primary hosts, for example, can maintain and replicate states of the computing cluster 100 and can be used to initiate failover actions. Any host that joins the computing cluster 100 can communicate with a host, such as an existing primary host, to complete its configuration.

The computing environment 203 can include, for example, a server or any other system providing computing capability. Alternatively, the computing environment 203 can include one or more computing devices that are arranged, for example, in one or more server banks, computer banks, computing clusters, or other arrangements. The computing environment 203 can include a grid computing resource or any other distributed computing arrangement. The computing devices can be located in a single installation or can be distributed among many different geographical locations. Although shown separately from the computing clusters 100, it is understood that in some examples the computing clusters 100 can be a portion of the computing environment 203.

The computing environment 203 can include or be operated as one or more virtualized computer instances. For purposes of convenience, the computing environment 203 is referred to herein in the singular. Even though the computing environment 203 is referred to in the singular, it is understood that a plurality of computing environments 203 can be employed in the various arrangements as described above. As the computing environment 203 communicates with the computing clusters 100 and client devices 206 for end users over the network 209, sometimes remotely, the computing environment 203 can be described as a remote computing environment 203 in some examples. Additionally, in some examples, the computing environment 203 can be implemented in servers 103 of a rack 212 and can manage operations of a virtualized computing environment. Hence, in some examples, the computing environment 203 can be referred to as a management cluster in the computing clusters 100.

The computing environment 203 can include a data store 223. The data store 223 can include memory of the computing environment 203, mass storage resources of the computing environment 203, or any other storage resources on which data can be stored by the computing environment 203. The data store 223 can include memory of the servers 103 in some examples. In some examples, the data store 223 can include one or more relational databases, object-oriented databases, hierarchical databases, hash tables or similar key-value data stores, as well as other data storage applications or data structures. The data stored in the data store 223, for example, can be associated with the operation of the various services or functional entities described below. For example, various host records 226 and guest records 229 can be stored in the data store 223.

A host record 226 can represent information related to a server 115 used as a host for a VM 106. For example, the host record 226 can include information such as the amount of memory installed on the server 103, the number and type of processors installed on the server 103, the number and type of GPUs installed on the server 103, the number and type of network connections installed on the server 103, and various other data.

The host record 226 can also include information related to the guest VMs 106 currently hosted on the server 103, stored in a list of current guests 231. For example, the host record 226 could include a record of the number of current guest VMs 106 hosted on the server 103. As another example, the host record 226 could include a record of the amount and type of computer resources currently allocated to each of the guest VMs 106. These records could include the number of processor cores, amount of memory, amount of storage, number of GPUs, and the number of network connections.

Likewise, the host record 226 could include the amount of allocated computer resources consumed by each of the guest VMs 106. For example, the host record 226 could include an indication that one guest VM is consuming 75% of the memory allocated to it and is using 47% of the processor resources allocated to it, while another guest VM 106 is consuming 15% of the memory allocated to it and is using 97% of the processor resources allocated to it. The allocation of computer resources to guest VMs 106 could be used to calculate various resource efficiencies 233 for a host server 103.

A resource efficiency 233 can represent an amount of expected performance loss due to contention for a computer resource, assuming that there is no concurrent contention for other resources. There may be a corresponding resource efficiency 233 stored for each type of physical resource provided by a server 103. For example, if a processor efficiency were 80%, this could indicate that processor contention would cause a 20% loss in overall VM 106 throughput. Other examples of resource efficiencies 233 include memory efficiency, network efficiency, graphics efficiency, and fault tolerance efficiency. These represent resource contention for the memory of the server 103, the network bandwidth available to the server 103, the GPU(s) provided by the server, and resources related to fault tolerance. In some implementations, resource efficiencies 233 may be calculated dynamically or otherwise on an as needed basis and then discarded when no longer required. In other implementations, resource efficiencies 233 may be calculated and cached for later use, as illustrated.

A host record 226 can also include a host identifier 236. The host identifier 236 may be used to uniquely identify a server 103 from other servers 103 in a computing cluster 100. Examples of host identifiers 236 include serial numbers, software assigned identification numbers (e.g., universally unique identifiers (UUIDs), globally unique identifiers (GUIDs), etc.), host names, and media access control (MAC) addresses of network interface cards installed on the server 103.

A guest record 229 can represent information related to a VM 106 executing as a guest hosted by a server 103. For example, this information can include the version and type of operating system installed on the VM 106. A guest record 229 can also include the number and type of applications installed on the VM 106. In some implementations, the guest record 229 could also include a record of the resource demand 239 placed on the host server 103.

The resource demand 239 may reflect the amount of computing resources a virtual machine 106 would consume if there were no contention for a resource. For example, the resource demand 239 may reflect that a VM 106 would consume 8 GB of RAM if the memory of the host server 103 were not overcommitted, but is currently only using 2 GB of RAM because of contention between VMs 106 for the memory of the host server 103. In some implementations, the resource demand 239 may include historical as well as current resource consumption.

Each guest record 229 may also include a power-on frequency 241, a record of a last migration 242, and a current host 243. The power-on frequency 241 represents the frequency of which the virtual machine 106 corresponding to the guest record 229 is instantiated, powered-on, restarted, rebooted, or otherwise reinitialized. The power-on frequency 241 may be tracked because, in some instances, it may be more efficient to allow for a virtual machine 106 that is rebooting to power-off on one host server 103 and power back up on another server 103 instead of incurring the costs of a live migration of the virtual machine 106. The record of the last migration 242 may record when the virtual machine 106 was last live migrated from one host server 103 to another host server 103, such as the current host 243. The current host 243 may represent the host identifier 236 of the host server 103 currently executing the VM 106.

Various applications can be executed on the computing environment 203. For example, a resource management service 246 can be executed by the computing environment 203. Other applications, services, processes, systems, engines, or functionality not discussed in detail herein may also be executed or implemented by the computing environment 203.

The resource management service 246 can be executed to allocate VMs 106 to one or more servers 103 based on various factors. For example, the resource management service 246 may reassign VMs 106 from one server 103 to another server 103 in order to more effectively use the servers 103 available. This may occur, for example, in response to increased demand for computing resources by a VM 106 hosted by a server 103. This might also occur, for example, in response to the instantiation of additional VMs 106 on the server 103.

Next, a general description of the operation of the various components of the computing clusters 100 of FIG. 1 and FIG. 2 within the network environment 200 of FIG. 2 is provided. More detailed description of the operation of specific components is provided in the following flowcharts of FIGS. 3-5

To begin, a number of virtual machines 106 are instantiated or powered on by hypervisors 109 executing on various host servers 103. As a request is made to instantiate a virtual machine 106, such as a request received from a client device 206, the resource management service 246 selects a server 103 to act as an initial host for the virtual machine 106. The selection of the initial server 103 to host a virtual machine 106 may be made based on a number of factors, such as one or more resource efficiencies 233 for a particular host server 103. The resource efficiencies 233 considered could include one or more of a processor efficiency, a memory efficiency, a network efficiency, a storage efficiency, a GPU efficiency, a fault tolerance efficiency, or similar resource efficiencies 233. How the resource efficiencies 233 are used to determine whether a host server 103 would be an optimal initial host server 103 are described in further detail later.

After each of the virtual machines 106 is assigned to a host server 103, the resource management service 246 monitors the performance of individual virtual machines 106 and host servers 103 to determine whether or not a virtual machine 106 should be migrated to another host server 103 in the computing cluster 100. The resource management service 246 may periodically evaluate, for each virtual machine 106, whether the current host server 103 or a potential new host server 103 in the computing cluster 100 is an optimal host server 103 for the VM 106. This may be done in order to rebalance the load of the virtual machines 106 across the servers 103 in a computing cluster 100 in response to changes in the network environment 200. For example, a lightly utilized VM 106 may suddenly experience a spike in demand, such that the lightly utilized VM 106 requires more computing resources than are available on host server 103 for the lightly utilized VM 106. In smaller deployments, the resource management service 246 may evaluate each host server 103 to determine which host server 103 would be an optimal host for each virtual machine 106. However, this approach may not scale well in larger deployments, where the resource management service 246 may instead select a subset of potential host servers 103 in the computing cluster 100 that would be most likely to be an optimal host for the VM 106.

The resource management service 246 can determine whether another host server 103 would be an optimal host server 103 based on a number of factors, such as one or more resource efficiencies 233 for a particular host server 103. The resource efficiencies 233 considered could include one or more of a processor efficiency, a memory efficiency, a network efficiency, a storage efficiency, a GPU efficiency, a fault tolerance efficiency, or similar resource efficiencies 233. How the resource efficiencies 233 are used to determine whether another host server 103 would be an optimal host server 103 are described in further detail later.

In some implementations, the resource management service 246 can then cause the virtual machine 106 to migrate from its current host server 103 to the optimal host server 103. However, there are costs involved in migration of a virtual machine 106 from one host server 103 to another host server 103. For example, the migration process can place a significant burden on the processor, memory, storage, and network resources of both the current host server 103 and the new host server 103. It is possible that, in some instances, the impact of the migration process on the performance of the virtual machine 106 during the migration process would negate any benefit from moving the virtual machine 106 to the optimal host server 103. Accordingly, the resource management service 246 may also consider the costs involved in migrating a virtual machine 106 from a current host server 103 to a new host server 103 in some implementations.

Figure 3:
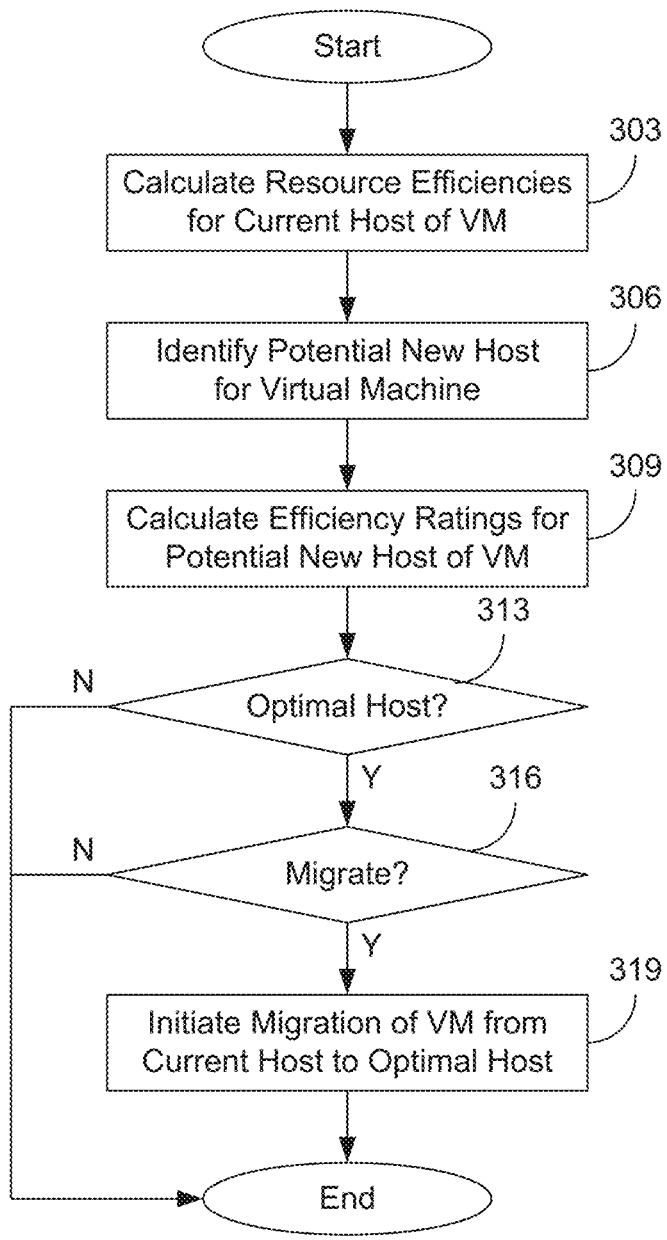
FIGS. 3-5 are flowcharts representing the implementation of functionality provided by components of the networked environment depicted in FIG. 2.

Moving on to FIG. 3, shown is a flowchart that provides one example of the operation of a portion of the network environment 200. The flowchart of FIG. 3 can be viewed as depicting an example of elements of a method implemented by the resource management service 246 or by the resource management service 246 executing in the computing environment 203 according to one or more examples. The separation or segmentation of functionality as discussed herein is presented for illustrative purposes only.

Beginning at step 303, the resource management service 246 calculates or otherwise determines one or more resource efficiencies 233 for the current host server 103 of a virtual machine 106. For example, the resource management service 246 may determine a processor efficiency for the current host server 103, a memory efficiency for the current host server 103, a network efficiency for the current host server 103, as well as resource efficiencies 233 for other computing resources provided by the current host server 103.

Processor efficiency can be based on one or more factors. These factors include ready time, scheduling overhead, overlap time, last level cache (LLC) contention, power management, and potentially other factors. Each of these factors is discussed in more detail below.

The processor efficiency can reflect the ready time of a CPU of a server 103. The ready time represents the amount of time that virtual CPUs assigned to virtual machines 106 spend waiting in a run queue due to CPU contention. The longer the virtual CPU waits to run on a physical CPU of the server 103, the less efficient the server 103 is considered to be. Accordingly, the ready time may be impacted by a number of factors, including the demand on the CPU of the server 103, the allocation of resources to individual VMs 106 hosted by the server 103, and the capacity of the CPU of the server 103. When the capacity of the CPU exceeds the demand placed on it by the hosted VMs 106, the ready time is zero because VMs 106 do not have to wait to utilize the CPU. This implies that the processor is operating at 100% efficiency. However, when the capacity of the CPU is less than the amount of processor resources allocated to the VMs 106 hosted by the server 103, then the server 103 can be considered to be over-committed. In this case, the impact of the ready time on the processor efficiency can be calculated based on the degree that the CPU of the server 103 is overcommitted.

The processor efficiency can also reflect scheduling overhead, which represents the amount of time that a processor spends making scheduling decisions, including performance loss due to context switching and cache state loss. In many cases, the schedule overhead may be negligible and therefore ignored to simplify the determination of processor efficiency. However, it may have a dispositive impact on processor efficiency in situations where a virtual machine 106 hosted by a server 103 blocks or wakes-up at high-frequencies (e.g., when the VM 106 is involved in high-frequency I/O).

In addition, the processor efficiency can also reflect last level cache (LLC) contention. When data required by the hypervisor 109 or a virtual machine 106 is not present in the LLC of a processor, the hypervisor 109 or the virtual machine 106 must retrieve the data from memory, which operates at speeds several orders of magnitude slower than the cache of the CPU. Therefore, the extent to which the LLC is utilized can impact the performance of the hypervisor 109 or the VM 106.

Many models can be used to estimate the impact of LLC contention. For example, a simple model could assume that the LLC is not fully utilized until the respective CPU reaches a load of 30%, at which point the cache contention increases linearly until LLC contention peaks at 25% when the CPU is at 100% load. However, other models may consider the cache occupancy of individual VMs 106 and their workload-specific cache-performance curves.

Moreover, the processor efficiency can also reflect the impact of power-management features on a CPU. For instance, many processors enable dynamic frequency scaling, sometime referred to as CPU throttling, whereby a CPU is able to automatically adjust its frequency to match the current load in order to conserve power and reduce the amount of heat generated. For example, a lightly loaded CPU may throttle its performance significantly in order to conserve power while still providing any executing processes with sufficient processing resources. As such, calculating the processor efficiency of a CPU that has reduced its frequency to match its workload may make CPU resources appear to be more heavily utilized than they actually are. Accordingly, the resource management service 246 may adjust the processor efficiency to account for the different between the processor's maximum frequency under load and its current frequency under the current load.

Memory efficiency is represented using a different model from processor efficiency. Once the physical memory of a server 103 has been over-committed, swapping occurs and performance for all VMs 106 hosted by the server 103 drop exponentially. However, there tends to be little, if any, impact on performance of a VM 106 until demand on a host's memory exceeds 100% of the installed memory. For example, the memory efficiency may be 100% until more than 100% of the installed memory is committed, at which point the drop off in performance may be modeled by using the formula:

$$\text{Eff(mem)}=(1/x)^3 \quad (1),$$

where x is the amount of percentage of the host's memory committed to various applications and VMs 106. For example, if a host's memory were oversubscribed, such that the memory demands of the VMs 106 and other applications installed on the host were 120% of the host's installed memory, then the memory efficiency would be $(1/1.2)^3=0.58$ according to the model defined by equation 2. However, other models that are more or less precise may be used according to various embodiments of the present disclosure.

Network efficiency can also be represented using its own model. For example, the latency of the network connection, the available bandwidth of the network connection, and the maximum supported number of packets per second can be used as factors in determining the network efficiency. Accordingly, a simple model for measuring network efficiency that takes some of these factors into account might use the following equation:

$$\text{Eff(net)}=1-(\text{consumedBandwidth/availableBandwidth}) \quad (2),$$

where the efficiency declines as the average amount of bandwidth used on a network connection approaches the available amount of bandwidth. For instance, if a host server 103 has a gigabit (1024 Mbit) network connection, and 384 Mbits were used on average, then the efficiency of the network connection would be computed as Eff(net)=1−(384/1024)=0.625. While the model of equation (2) depicts a linear model, non-linear models may also be used for environments where the performance of a VM 106 decays exponentially as the usage of a network connection of a host server 103 increases.

Likewise, as a network connection approaches its maximum number of packets per second that can be transmitted, throughput performance tends to drop off due to packet collisions, while packet latency and packet jitter tend to increase due to buffer bloat. This is more likely to occur when VMs 106 send large numbers of small packets. In contrast, VMs 106 that send small numbers of large packets tend to more efficiently use the available bandwidth of a network connection while minimizing the impact on latency. Therefore, other models that take these additional factors into account may be used in some implementations.

Next at step 306, the resource management service 246 identifies a potential new host server 103 from a plurality of host servers 103 in a computing cluster 100 of the network environment 200. The potential new host server 103 may be selected from the plurality of host servers 103 based on one or more factors, such as the current load of the potential new host server 103 or other factors. This step is described in further detail in the following flowchart of FIG. 4.

Then at step 309, the resource management service 246 calculates or otherwise determines one or more resource efficiencies 233 for the potential new host server 103 of the virtual machine 106. For example, the resource management service 246 may determine a processor efficiency for the potential new host server 103, a memory efficiency for the potential new host server 103, a network efficiency for the potential new host server 103, as well as resource efficiencies 233 for other computing resources provided by the potential new host server 103. These resource efficiencies 233 can be calculated in the same manner as the resource efficiencies 233 for the current host server 103 are calculated at step 303.

At step 313, the resource management service 246 can determine whether the potential new host server 103 identified at step 306 would be an optimal host server 103 for the virtual machine 106. This determination can be made in a number of ways. For example, the resource management service 246 could calculate a first "goodness score" representing the current host server 103 and a second "goodness score" representing the potential new host server 103. The resource management service 246 could then compare the first goodness score to the second goodness score. If the second goodness score representing the potential new host server 103 were higher, then the resource management service 246 could determine that the potential new host server 103 is the optimal host server 103. In this instance, the process would proceed to step 316. However, if the second goodness score were less than or equal to the first goodness score, then the resource management service 246 could determine that the potential new host server 103 was either less appropriate than or equally appropriate to the current host server 103 for the virtual machine 106. If this were the case, then the process would end with respect to this potential new host server 103.

A goodness score is a numeric representation of how good a host server 103 is for a given virtual machine 106. A goodness score for a particular server 103 may be calculated as the product of multiple resource efficiencies 233 of the server 103. For example, a goodness score could represent the product of a processor efficiency and a memory efficiency. This could be represented by the equation:

$$\text{goodness}=\text{Eff(cpu)}*\text{Eff(mem)} \quad (3)$$

Similarly, implementations that were concerned about network efficiency in addition to processor efficiency and memory efficiency could use the following equation:

$$\text{goodness}=\text{Eff(cpu)}*\text{Eff(mem)}*\text{Eff(net)} \quad (4).$$

Likewise, implementations that were concerned about processor efficiency and network efficiency, but were unconcerned with memory efficiency, could use the following equation:

$$\text{goodness}=\text{Eff(mem)}*\text{Eff(net)} \quad (5).$$

Other implementations could use other, similar equations to take into consideration other resource efficiencies 233 or combinations of resource efficiencies that were important to the particular implementation.

Then at step 316, the resource management service 246 determines whether or not to cause the virtual machine 106 to migrate from the current host server 103 to the optimal host server 103 identified at step 313. This determination may be made based on a variety of factors, including the impact of the migration process on the current host server 103 and the optimal host server 103. This step is described in further detail in the following flowchart of FIG. 5. If the resource management service 246 determines that the VM 106 should be migrated to the optimal host server 103, then the process proceeds to step 319. However, if the resource management service 246 determines that there would be insufficient benefit to migrating the VM 106, then the process ends.

Next at step 319, the resource management service 246 can cause the hypervisor 109 of the current host server 103 to initiate a live migration of the virtual machine 106 to the optimal host server 103. For example, the resource management service 246 could send a message containing the host identifier 236 of the optimal host server 103, the VM identifier 240 of the virtual machine 106 to be migrated, and an instruction to the hypervisor 109 begin a migration of the virtual machine 106 from the current host server 103 to the optimal host server 103. The process would then end.

Figure 4:
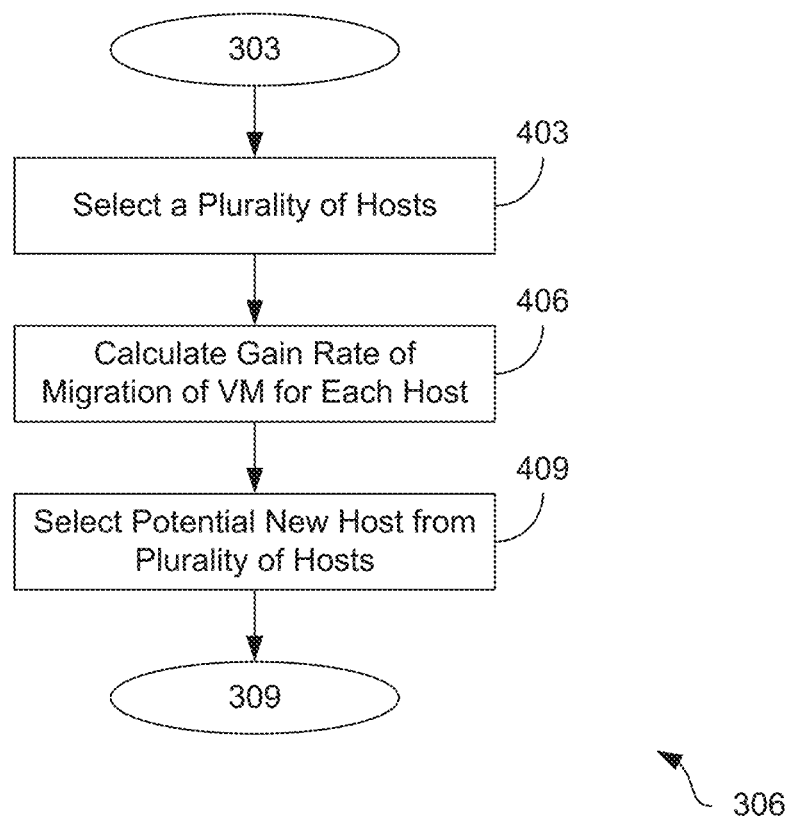

Moving on to FIG. 4, shown is a flowchart that provides one example of the operation of a portion of the network environment 200. The flowchart of FIG. 4 can be viewed as depicting an example of elements of a method used to implement the functionality previously discussed at step 306 of FIG. 3. Likewise, the flowchart of FIG. 4 can be viewed as depicting an example of elements of a method implemented by the resource management service 246 or by the resource management service 246 executing in the computing environment 203 according to one or more examples. The separation or segmentation of functionality as discussed herein is presented for illustrative purposes only.

Proceeding from step 303, as previously described with respect to FIG. 3, to step 403, the resource management service 246 selects a plurality of host servers 103 as potential host servers 103. In smaller deployments, this may include every server 103 in a computing cluster 100. In larger deployments with large numbers of servers 103, which may be spread over a number of computing clusters 100, a sample or subset of servers 103 may be selected. For example, a server 103 may be ignored as a candidate host if a resource efficiency 233 in the respective host record 226 is below a predefined threshold, indicating that even if the server 103 were a good host, it would be unlikely be used because it would fail the cost-benefit analysis previously described at step 316 in FIG. 3 and illustrated in further detail in the discussion of FIG. 5.

Then at step 406, the resource management service 246 can calculate a gain rate for each host server 103 selected at step 403. The gain rate can represent the expected or anticipated performance benefit resulting from a migration of a virtual machine 106 from a current host server 103 to a new host server 103. In some implementations, the gain rate is the product of the resource demand 239 of a virtual machine 106 and the difference in resource efficiencies 233 between the servers 103. For example, some implementations could calculate the gain rate based on the CPU usage of a virtual machine 106, as represented by the following formula:

$$\text{gainRate}=\text{cpuDemand}*(\text{Eff}(\text{dest})-\text{Eff}(\text{src})) \quad (6)$$

Using this formula as an example, if the resource demand 239 for a CPU were 2000 MHz, the processor efficiency of the potential new host server 103 were 90%, and the processor efficiency of the current host server 103 were 80%, then the gain rate would be 2000*(0.9−0.8)=200 Mhz per second. Similar formulas could be used to calculate a gainRate based on memory consumption of a VM 106, network utilization of a VM 106, or other factors, as desired for specific implementations.

Moving on to step 409, the resource management service 246 can select a potential new host server 103 from the plurality of servers 103 selected previously at step 403 based on the gain rates calculated at step 406. For example, the resource management service 246 may select the server 103 with the highest gain rate, indicating the largest potential increase in performance if the VM 106 were to be transferred from the current host server 103 to the selected potential new host server 103. However, because other factors such as memory efficiency, network efficiency, and contention for other computing resources may also impact whether there would be a performance increase if the VM 106 were to migrate to the selected potential new host server 103, additional analysis of the selected potential new host server 103 will be performed, as previously described in the discussion of FIG. 3.

Figure 5:
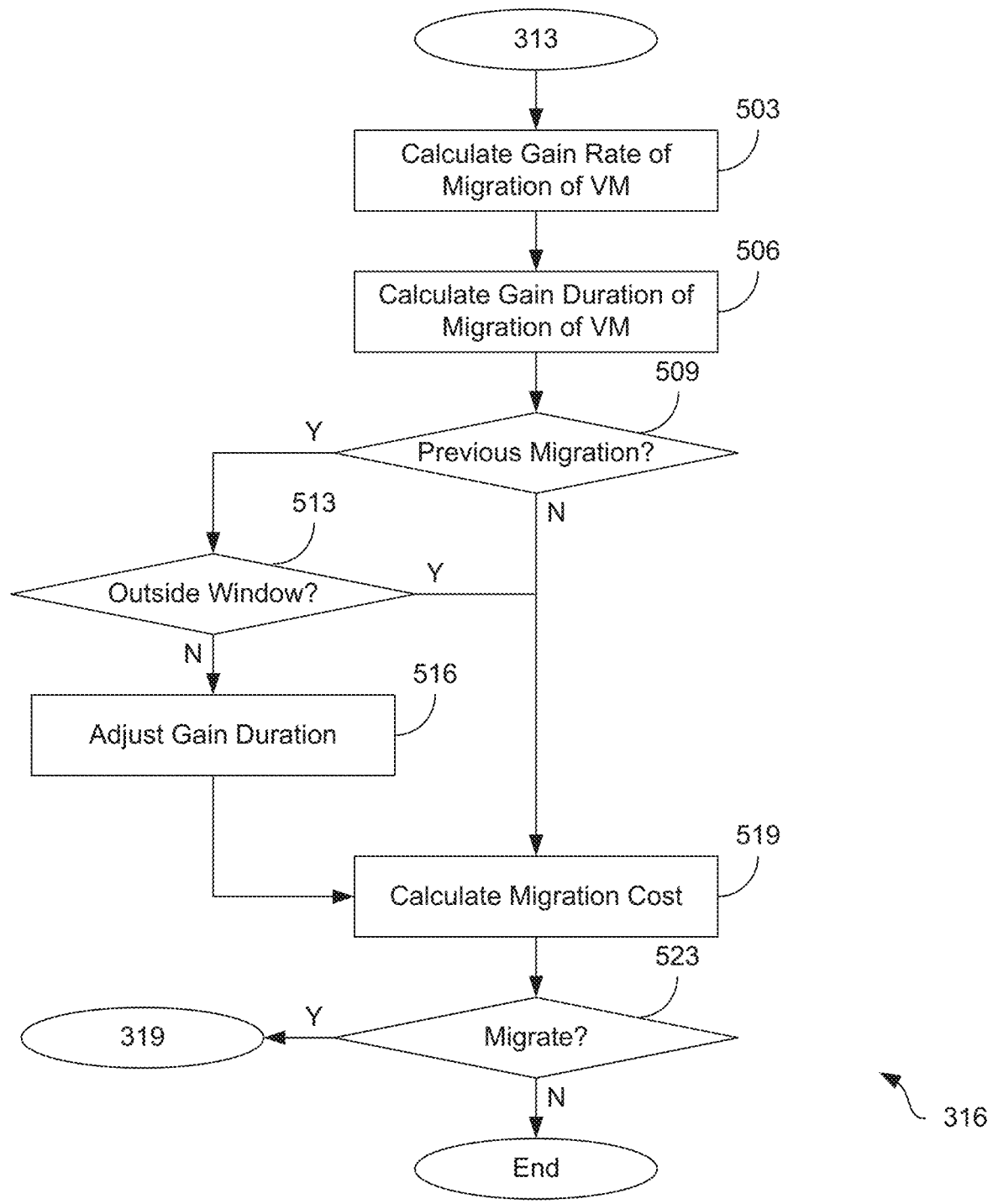

Moving on to FIG. 5, shown is a flowchart that provides one example of the operation of a portion of the network environment 200. The flowchart of FIG. 5 can be viewed as depicting an example of elements of a method used to implement the functionality previously discussed at step 316 of FIG. 3. Likewise, the flowchart of FIG. 5 can be viewed as depicting an example of elements of a method implemented by the resource management service 246 or by the resource management service 246 executing in the computing environment 203 according to one or more examples. The separation or segmentation of functionality as discussed herein is presented for illustrative purposes only.

Proceeding from step 313, as previously described with respect to FIG. 3, to step 503, the resource management service 246 calculates the gain rate resulting from the migration of the virtual machine 106. The gain rate may be calculated using the same or a similar approach as previously described with respect to step 406 of FIG. 4.

Then at step 506, the resource management service 246 can calculate the gain duration associated with the optimal host server 103. The gain duration is calculated in order to determine whether any gains resulting from a migration of the virtual machine 106 from the current host server 103 to the optimal host server 103 would be transitory. The gain duration can be estimated or calculated based on a number of factors, such as the power-on frequency 241 for the virtual machine 106 and the time required to migrate the virtual machine 106 from the current host server 103 to the optimal host server 103.

The power-on frequency 241 may be considered because powering on or rebooting a virtual machine 106 is usually a quicker and cheaper operation than migrating a virtual machine 106. Therefore, it may be more effective to wait until the virtual machine 106 reboots to move the virtual machine 106 from one host to another. For example, a first hypervisor 109 executing on the current host server 103 could power-off the virtual machine 106 as part of a reboot of the virtual machine 106. A second hypervisor 109 executing on the optimal host server 103 could then power-on the virtual machine 106 on the optimal host server 103.

The time required to migrate a virtual machine 106 is also a factor in determining the gain duration because migration of a currently executing virtual machine 106 is a resource intensive operation that can adversely impact the operation of the host server 103 that the VM 106 is migrating from and the host server 103 that the VM 106 is migrating to. Accordingly, there might be a performance decrease during the time that migration of the currently executing virtual machine 106 occurs. This performance impact may be accounted for in some implementations of the present disclosure.

These factors may be accounted for in a number of ways. For example, a simple equation that could be used to calculate the gain duration would be:

$$\text{gainDuration}=\text{NextPowerTime}-\text{CurrentTime}-\text{MigrationTime} \quad (7)$$

In this equation, the gain duration would be expected to be the amount of time to the next expected power-on event of a VM 106 less the amount of time required to perform a migration of the VM 106 from one host to another. When the next power-on event for the VM 106 could be determined from the power-on frequency 241 stored in the guest record 229 for the optimal host server 103. For example, if the VM 106 were expected to be rebooted in three (3) hours, and it were anticipated that the time to migrate a VM 106 from one host to another host would be 98 seconds, then the expected gain duration resulting from a migration of the host would be 10,702 seconds. Likewise, if the VM 106 were expected to be rebooted in five (5) minutes, and the anticipated time to migrate the VM 106 were expected to be 77 seconds, then the gain duration resulting from the migration would be 223 seconds.

It should be noted that other formulas may be used as appropriate for particular implementations. For example, some implementations may weight one or more of the variables to adjust the impact on the calculated gain duration. As another example, some implementations may consider additional factors than the power-on frequency and migration time associated with the VM 106.

Moving on to step 509, the resource management service 246 determines whether the virtual machine 106 has been previously migrated from one host server 103 to another host server 103. For example, the resource management service 246 may check the record for the last migration 242 in the guest record 229 for the virtual machine 106. If the virtual machine 106 has not been previously migrated, execution skips to step 519. However, if the virtual machine 106 has been previously migrated, then the process proceeds to step 513.

At step 513, the resource management service 246 can check the last migration 242 to determine when the virtual machine 106 was last migrated from one host to another. To avoid the performance impacts of thrashing, where a VM 106 is repeatedly migrated between hosts in quick succession, the resource management service 246 may weigh the determination of whether or not to cause the VM 106 to migrate again. Accordingly, the resource management service 246 can then determine whether the time that the virtual machine 106 was last migrated occurred within a predefined window of time prior to the current time. If the VM 106 was last migrated outside of the predefined window of time, then the process skips to step 519. However, if the VM's 106 last migration 242 occurred within the predefined window of time, then the process proceeds to step 516.

Next at step 516, the resource management service 246 adjusts that gain duration associated with migration of the VM 106 to weigh against a determination to migrate the VM 106 again. For example, the gain duration previously calculated at step 506 may be decreased, divided, or otherwise reduced by a predefined amount or factor. Once the gain duration has been reduced, the process proceeds to step 519.

Proceeding to step 519, the resource management service 246 can calculate the cost associated with migration of the virtual machine 106 from the current host server 103 to the optimal host server 103 previously identified at step 313. The cost can be based on a number of factors, including the number of processor cores that the sending and receiving servers 103 are expected to use, how fast each processor core is, the amount of memory associated with the VM 106 that is expected to be transferred, and potentially other data.

For example, the following simple equation could be used to calculate the expected cost to migrate a virtual machine 106:

$$\text{MigrationCost}=\text{costPerMB}*\text{MemSize} \quad (8)$$

Here, the memory size can represent the amount of memory to be copied from one host to another host, which can be estimated based on the virtual machine's 106 active memory size and its expected dirty memory rate. The cost-per-megabyte is the expected number of processor cycles required to copy each megabyte of VM 106 memory. The cost-per-megabyte can vary between implementations as different hypervisors 109 from different vendors may use different algorithms and techniques to implement a migration of a VM 106. Likewise, the cost-per-megabyte may vary between versions of a hypervisor 109 provided by the same vendor as revisions are made over time.

Next, at step 523, the resource management service 246 can then determine whether the cost of a migration outweighs the benefits of a migration. To make the cost-benefit determination, the resource management service 246 multiplies the gain rate by the gain duration and compares that value to the migration cost. If the migration cost is less than the product of the gain rate and the gain duration, then the resource management service 246 can determine that the virtual machine 106 should be migrated from the current host server 103 to the optimal host server 103. In this case, the process proceeds to step 319, which was previously discussed with respect to FIG. 3. However, if the migration cost is greater than the product of the gain rate and the gain duration, then the costs involved with migration of the virtual machine 106 are likely to outweigh the benefits of the virtual machine 106 executing on the new, optimal host server 103. In this case, the process ends.

Although the resource management service 142 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

We claim the following:

1. A system, comprising:
   a computing device comprising a processor and a memory;
   machine readable instructions stored in the memory that, when executed by the processor, cause the computing device to at least:
   calculate a first plurality of efficiency ratings inversely related to resource usage of a first set of hardware resources for a current host of a virtual machine, the first plurality of efficiency ratings comprising:
   a first efficiency rating for processor usage of the current host, and
   a second efficiency rating for memory usage of the current host;
   calculate a second plurality of efficiency ratings inversely related to resource usage of a second set of hardware resources for a potential new host of the virtual machine, the second plurality of efficiency ratings comprising:
   a third efficiency rating for processor usage of the potential new host,
   a fourth efficiency rating for memory usage of the potential new host;
   compare a first goodness score comprising a product of the first plurality of efficiency ratings inversely related to resource usage of the first set of hardware resources, to a second goodness score comprising a product of the second plurality of efficiency ratings inversely related to resource usage of the second set of hardware resources to determine that the potential new host for the virtual machine is an optimal host for the virtual machine;
   calculate a migration cost for migration of the virtual machine from the current host to the optimal host, wherein the migration cost represents a product of an amount of memory to be copied from the current host to the optimal host and an expected number of processor cycles required to copy each unit of the amount of memory from the current host to the optimal host;
   determine that the migration cost is below a threshold value; and
   initiate migration of the virtual machine from the current host to the optimal host for execution on the optimal host in response to a determination that the migration cost is below the threshold value.

2. The system of claim 1, wherein the machine readable instructions, when executed by the processor, further cause the computing device to at least:
   calculate a gain rate associated with migration of the virtual machine from the current host to the optimal host;
   calculate a gain duration associated with migration of the virtual machine from the current host to the optimal host; and
   calculate the threshold value based at least in part on the gain rate and the gain duration.

3. The system of claim 2, wherein the machine readable instructions that cause the computing device to calculate the gain rate further cause the computing device to at least:
   determine a processor demand associated with the virtual machine; and
   calculate the gain rate based at least in part on the processor demand, the first efficiency rating for processor usage of the current host, and the third efficiency rating for processor usage of the potential new host.

4. The system of claim 2, wherein the machine readable instructions that cause the computing device to calculate the gain duration further cause the computing device to at least:
   determine a power-on frequency for the virtual machine;
   estimate a time to migrate the virtual machine from the current host to the optimal host; and
   calculate the gain duration based at least in part on the power-on frequency and the time to migrate the virtual machine.

5. The system of claim 1, wherein:
   the first efficiency rating for processor usage of the current host is based at least in part on:
   a first amount of time that a virtual processor associated with the virtual machine spends in a first run queue provided by the current host, and
   a first amount of contention for a first last level cache of a first processor of the current host; and
   the third efficiency rating for processor usage of the potential new host is based at least in part on:
   a second amount of time that the virtual processor associated with the virtual machine would spend in a second run queue provided by the potential new host, and
   a second amount of contention for a second last level cache of a second processor of the potential new host.

6. The system of claim 1, wherein:
the second efficiency rating for memory usage of the current host is based at least in part on a current memory utilization of the current host; and
the fourth efficiency rating for memory usage of the potential new host is based at least in part on a current memory utilization of the potential new host.

7. The system of claim 1, wherein the machine readable instructions further cause the computing device to at least:
calculate the first plurality of efficiency ratings for the current host of the virtual machine based at least in part on a fifth efficiency rating for network usage of the current host that is based at least in part on a current utilization of a first network interface card installed on the current host; and
calculate the second plurality of efficiency ratings for the potential new host of the virtual machine based at least in part on a sixth efficiency rating for network usage of the potential new host that is based at least in part on a current utilization of a second network interface card installed on the potential new host.

8. A method, comprising:
calculating a first plurality of efficiency ratings inversely related to resource usage of a first set of hardware resources for a current host of a virtual machine, the first plurality of efficiency ratings comprising:
a first efficiency rating for processor usage of the current host; and
a second efficiency rating for memory usage of the current host;
calculating a second plurality of efficiency ratings inversely related to resource usage of a second set of hardware resources for a potential new host of the virtual machine, the second plurality of efficiency ratings comprising:
a third efficiency rating for processor usage of the potential new host; and
a fourth efficiency rating for memory usage of the potential new host;
comparing a first goodness score comprising a product of the first plurality of efficiency ratings inversely related to resource usage of the first set of hardware resources, to a second goodness score comprising a product of the second plurality of efficiency ratings inversely related to resource usage of the second set of hardware resources to determine that the potential new host for the virtual machine is an optimal host for the virtual machine;
calculating a migration cost for migration of the virtual machine from the current host to the optimal host, wherein the migration cost represents a product of an amount of memory to be copied from the current host to the optimal host and an expected number of processor cycles required to copy each unit of the amount of memory from the current host to the optimal host;
determining that the migration cost is below a threshold value; and
initiating migration of the virtual machine from the current host to the optimal host for execution on the optimal host in response to determining that the migration cost is below the threshold value.

9. The method of claim 8, further comprising:
calculating a gain rate associated with migration of the virtual machine from the current host to the optimal host;
calculating a gain duration associated with migration of the virtual machine from the current host to the optimal host; and
calculating the threshold value based at least in part on the gain rate and the gain duration.

10. The method of claim 9, wherein calculating the gain rate further comprises:
determining a processor demand associated with the virtual machine; and
calculating the gain rate based at least in part on the processor demand, the first efficiency rating for processor usage of the current host, and the third efficiency rating for processor usage of the potential new host.

11. The method of claim 9, wherein calculating the gain duration further comprises:
determining a power-on frequency for the virtual machine;
estimating a time to migrate the virtual machine from the current host to the optimal host; and
calculating the gain duration based at least in part on the power-on frequency and the time to migrate the virtual machine.

12. The method of claim 8, wherein:
the first efficiency rating for processor usage of the current host is based at least in part on:
a first amount of time that a virtual processor associated with the virtual machine spends in a first run queue provided by the current host, and
a first amount of contention for a first last level cache of a first processor of the current host; and
the third efficiency rating for processor usage of the potential new host is based at least in part on:
a second amount of time that the virtual processor associated with the virtual machine would spend in a second run queue provided by the potential new host, and
a second amount of contention for a second last level cache of a second processor of the potential new host.

13. The method of claim 8, wherein:
the second efficiency rating for memory usage of the current host is based at least in part on a current memory utilization of the current host; and
the fourth efficiency rating for memory usage of the potential new host is based at least in part on a current memory utilization of the potential new host.

14. The method of claim 8, further comprising:
calculating the first plurality of efficiency ratings for the current host of the virtual machine based at least in part on a fifth efficiency rating for network usage of the current host that is based at least in part on a current utilization of a first network interface card installed on the current host; and
calculating the second plurality of efficiency ratings for the potential new host of the virtual machine based at least in part on a sixth efficiency rating for network usage of the potential new host that is based at least in part on a current utilization of a second network interface card installed on the potential new host.

15. A non-transitory computer readable medium, comprising machine readable instructions that, when executed by a processor, cause a computing device to at least:
calculate a first plurality of efficiency ratings inversely related to resource usage of a first set of hardware resources for a current host of a virtual machine, the first plurality of efficiency ratings comprising:

a first efficiency rating for processor usage of the current host, and a second efficiency rating for memory usage of the current host;

calculate a second plurality of efficiency ratings inversely related to resource usage of a second set of hardware resources for a potential new host of the virtual machine, the second plurality of efficiency ratings comprising:

a third efficiency rating for processor usage of the potential new host, a fourth efficiency rating for memory usage of the potential new host;

compare a first goodness score comprising a product of the first plurality of efficiency ratings that are inversely related to resource usage of the first set of hardware resources, to a second goodness score comprising a product of the second plurality of efficiency ratings that are inversely related to resource usage of the second set of hardware resources to determine that the potential new host for the virtual machine is an optimal host for the virtual machine;

calculate a migration cost for migration of the virtual machine from the current host to the optimal host, wherein the migration cost represents a product of an amount of memory to be copied from the current host to the optimal host and an expected number of processor cycles required to copy each unit of the amount of memory from the current host to the optimal host;

determine that the migration cost is below a threshold value; and initiate migration of the virtual machine from the current host to the optimal host for execution on the optimal host in response to a determination that the migration cost is below the threshold value.

16. The non-transitory computer readable medium of claim 15, wherein the machine readable instructions further cause the computing device to at least:

calculate a gain rate associated with migration of the virtual machine from the current host to the optimal host;

calculate a gain duration associated with migration of the virtual machine from the current host to the optimal host; and calculate the threshold value based at least in part on the gain rate and the gain duration.

17. The non-transitory computer readable medium of claim 16, wherein the machine readable instructions that cause the computing device to calculate the gain rate further cause the computing device to at least:

determine a processor demand associated with the virtual machine; and calculate the gain rate based at least in part on the processor demand, the first efficiency rating for processor usage of the current host, and the third efficiency rating for processor usage of the potential new host.

18. The non-transitory computer readable medium of claim 16, wherein the machine readable instructions that cause the computing device to calculate the gain duration further cause the computing device to at least:

determine a power-on frequency for the virtual machine;

estimate a time to migrate the virtual machine from the current host to the optimal host; and calculate the gain duration based at least in part on the power-on frequency and the time to migrate the virtual machine.

19. The non-transitory computer readable medium of claim 15, wherein:

the first efficiency rating for processor usage of the current host is based at least in part on:

a first amount of time that a virtual processor associated with the virtual machine spends in a first run queue provided by the current host, and a first amount of contention for a first last level cache of a first processor of the current host; and the third efficiency rating for processor usage of the potential new host is based at least in part on:

a second amount of time that the virtual processor associated with the virtual machine would spend in a second run queue provided by the potential new host, and a second amount of contention for a second last level cache of a second processor of the potential new host.

20. The non-transitory computer readable medium of claim 15, wherein:

the second efficiency rating for memory usage of the current host is based at least in part on a current memory utilization of the current host; and the fourth efficiency rating for memory usage of the potential new host is based at least in part on a current memory utilization of the potential new host.

* * * * *